(12) United States Patent
Freedman et al.

(10) Patent No.: US 9,696,453 B2
(45) Date of Patent: Jul. 4, 2017

(54) PREDICTING MINERALOGY PROPERTIES FROM ELEMENTAL COMPOSITIONS

(71) Applicant: Schlumberger Technology Corporation, Sugar Land, TX (US)

(72) Inventors: Robert Freedman, Houston, TX (US); Vivek Anand, Houston, TX (US); Susan Herron, Ridgefield, CT (US); Michael M. Herron, Ridgefield, CT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 615 days.

(21) Appl. No.: 13/791,931

(22) Filed: Mar. 9, 2013

(65) Prior Publication Data

US 2014/0214324 A1 Jul. 31, 2014

Related U.S. Application Data

(60) Provisional application No. 61/757,016, filed on Jan. 25, 2013.

(51) Int. Cl.
*G01V 5/10* (2006.01)
*G01V 5/08* (2006.01)
(Continued)

(52) U.S. Cl.
CPC .................. *G01V 5/08* (2013.01); *G01V 3/12* (2013.01); *G01V 5/10* (2013.01); *G01V 5/12* (2013.01);
(Continued)

(58) Field of Classification Search
CPC .......... G01V 5/12; G01V 5/045; G01V 5/101; G01V 5/125; G01V 3/12; G01V 3/30;
(Continued)

(56) References Cited

U.S. PATENT DOCUMENTS 4,912,323 A 3/1990 Bhat et al.
5,699,246 A 12/1997 Plasek et al.
(Continued)

FOREIGN PATENT DOCUMENTS

WO 2012078942 A2 6/2012

OTHER PUBLICATIONS

Herron, et al., "Application of Nuclear Spectroscopy Logs to the Derivation of Formation Matrix Density", 41st Annual Logging Symposium of the Society of Professional Well Log Analysts, Dallas, Texas, Jun. 4-7, 2000, pp. 1-12.
(Continued)

*Primary Examiner* — Jonathan C Teixeira Moffat
*Assistant Examiner* — Lynda Dinh
(74) *Attorney, Agent, or Firm* — Michael Dae

(57) ABSTRACT

A method for predicting at least one property of a geological formation may include generating mapping function values relating a plurality of reference elemental compositions to corresponding reference properties thereof based upon at least one non-linear mapping function. The method may further include determining a sample elemental composition of at least one sample associated with the geological formation and performing, using a processor, an interpolation to map the sample elemental composition to at least one sample property based upon the mapping function values and the at least one non-linear function.

12 Claims, 12 Drawing Sheets

(51) Int. Cl.
*G01V 5/12* (2006.01)
*G01V 3/12* (2006.01)
*G01V 5/04* (2006.01)
*G01V 3/34* (2006.01)
*G01V 3/30* (2006.01)

(52) U.S. Cl.
CPC .................. *G01V 3/30* (2013.01); *G01V 3/34* (2013.01); *G01V 5/04* (2013.01); *G01V 5/045* (2013.01)

(58) Field of Classification Search
CPC ... G01V 3/34; G01V 1/40; G01V 1/50; G01V 5/08; G01V 3/00; G01V 3/08; G01V 5/10; G01V 5/04
USPC .......................................................... 702/8
See application file for complete search history.

(56) References Cited

U.S. PATENT DOCUMENTS

| | | | |
|---|---|---|---|
| 7,309,983 | B2 | 12/2007 | Freedman |
| 2009/0254283 | A1 | 10/2009 | Jacobi et al. |
| 2010/0271019 | A1 | 10/2010 | Anand et al. |
| 2010/0313633 | A1* | 12/2010 | Anand et al. ................ 73/38 |
| 2011/0022320 | A1* | 1/2011 | Abousleiman et al. ....... 702/12 |
| 2011/0257944 | A1* | 10/2011 | Du et al. ..................... 703/2 |
| 2012/0233095 | A1 | 9/2012 | Evensen |
| 2013/0182819 | A1* | 7/2013 | Dvorkin .............. G01N 23/046 378/5 |

OTHER PUBLICATIONS

Herron, et al., "Quantitative Lithology: an Application for Open and Cased Hole Spectroscopy", SPWLA 37th Annual Logging Symposium, New Orleans, Louisiana, Jun. 16-19, 1996, pp. 1-14.

Horkowitz, et al., "Complex Reservoir Evaluation in Open and Cased Wells", 38th Annual SPWLA, Houston, Texas, Jun. 15-18, 1997, pp. 1-14.

Radtke, et al., "A New Caputre and Inelastic Spectroscopy Tool Takes Geochemical Logging to the Next Level", SPWLA 53rd Annual Logging Symposium, Cartagena, Colombia, Jun. 16-20, 2012, pp. 1-16.

R. Freedman, SPE. V. Anand, SPE. T. Zhou, SPE. D. Rose, SPE. and S. Beekman, SPE. Schlumberger, "A Modern Method for Using Databases to Obtain Accurate Solutions to Complex Reservoir-Characterization Problems," SPE Reservoir Evaluation & Engineering, vol. 15, No. 4, Aug. 2012, pp. 453-461.

Freedman, "New Approach for Solving Inverse Problems Encountered in Well-Logging and Geophysical Applications," Petrophysics, vol. 47, No. 2 (Apr. 2006); pp. 93-111; 14 Figures, 2 Tables.

* cited by examiner

PREDICTING MINERALOGY PROPERTIES FROM ELEMENTAL COMPOSITIONS

CROSS-REFERENCE TO RELATED APPLICATIONS

This application claims benefit of U.S. provisional patent application Ser. No. 61/757,016, filed Jan. 25, 2013, which is herein incorporated by reference.

BACKGROUND

Modern suites of well logging measurements are used to predict porosity and fluid saturations of reservoir rocks surrounding a borehole. Porosity and fluid saturations are useful for accurate reserve estimation and identification of potential pay zones. More accurate porosities and fluid saturations may be predicted if detailed and accurate mineralogical information is available. Mineralogical data provide more accurate characterization of logging tool responses and, as a result, lead to improved log interpretations. Knowledge of the clay mineral types present in reservoir rocks and their volumes is an indicator of reservoir quality and is also used in the selection of hydraulic fracturing, completion, and stimulation fluids.

Spectral gamma-ray logging tools provide elemental compositions of reservoir rocks (e.g., Si, Al, Ca, Mg, K, Fe, S, etc.) derived from capture and inelastic neutron gamma ray spectroscopy. The elemental compositions are given as the weight fractions of the individual elements present in the rock matrix. They are used to predict mineralogy and rock properties such as grain density. The inversion of elemental composition to predict accurate mineralogy is a complex issue in reservoir characterization. The complexity arises because of the large number of minerals that are commonly found in reservoir rocks and the variability of the compositions of these minerals. Moreover, the mineralogy inverse problem may be complicated by the fact that many of the measured elements are common to different minerals. Thus, there exists a degree of non-uniqueness in the reconstruction of mineralogy from elemental composition data.

In the absence of gamma ray spectroscopy data, petrophysicists and other log analysts use conventional logging tool measurements to define the reservoir lithology or mineralogy. The different responses of neutron, density, and sonic logs in sandstones, limestones, and dolomites are cross-plotted in logging service company chart books and can be used to identify lithology and correct the log derived porosities. Shale volumes are predicted from natural gamma-ray logs, neutron-density, dielectric, and other logging tool responses. These shale volume estimates may depend on choosing a "clean sand" tool response in the well. The sands selected as clean can in fact be quite shaly, and this leads to unknown errors in the estimated shale volumes. Without the elemental composition data provided by gamma ray spectroscopy tools, it may not be possible to derive a detailed and accurate description of the reservoir mineralogy.

Because of the complexity of the mathematical relationship between elemental composition and mineralogy it is difficult to derive accurate forward models that predict mineralogy from rock chemistry. This is also true for most other reservoir characterization issues for which idealized forward models do not accurately account for the behavior of complex reservoir rocks and fluids.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for predicting at least one property of a geological formation may include generating mapping function values relating a plurality of reference elemental compositions to corresponding reference properties thereof based upon at least one non-linear mapping function. The method may further include determining a sample elemental composition of at least one sample associated with the geological formation and performing, using a processor, an interpolation to map the sample elemental composition to at least one sample property based upon the mapping function values and the at least one non-linear function.

A related well-logging system may include a well-logging tool to determine a sample elemental composition of at least one sample associated with the geological formation, and a processor. The processor may generate mapping function values relating a plurality of reference elemental compositions to corresponding reference properties thereof based upon at least one non-linear mapping function, and perform an interpolation to map the sample elemental composition to at least one sample property based upon the mapping function values and the at least one non-linear function.

A non-transitory computer-readable medium may have computer-executable instructions for causing a computer to generate mapping function values relating a plurality of reference elemental compositions to corresponding reference properties thereof based upon at least one non-linear mapping function, and determine a sample elemental composition of at least one sample associated with the geological formation, and perform an interpolation to map the sample elemental composition to at least one sample property based upon the mapping function values and the at least one non-linear function.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
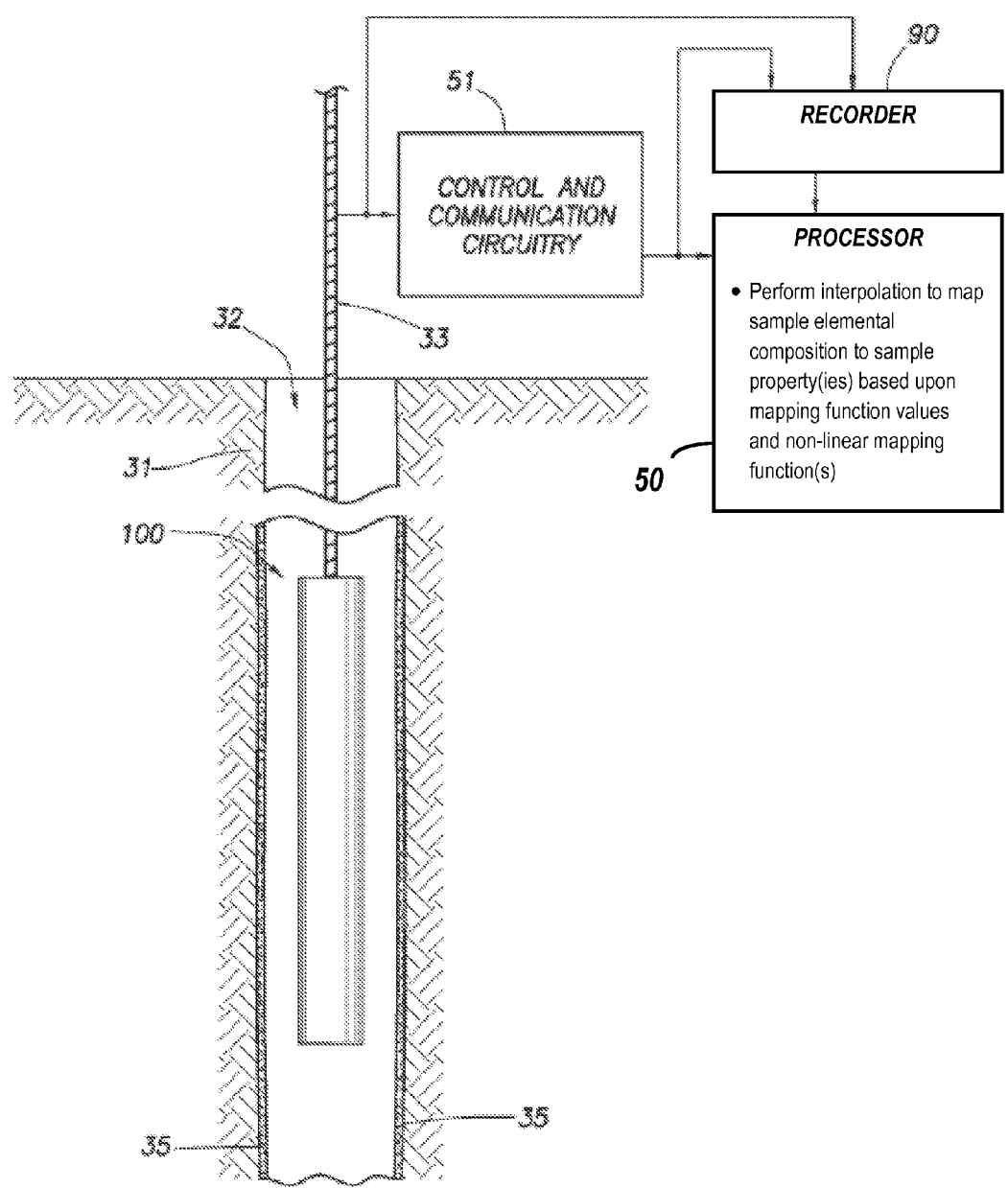
FIG. 1 is a schematic diagram, partially in block form, of a well logging apparatus which may be used in example embodiments.

Referring initially to FIG. 1, a well logging system 30 is first described. A borehole 32 is drilled in a formation 31 with drilling equipment, and may use drilling fluid or mud that results in a mudcake represented at 35. A logging device or tool 100 is suspended in the borehole 32 on an armored multiconductor cable 33 to provide a wireline configuration, although logging while drilling (LWD) or measurement while drilling (MWD) configurations may also be used. The length of the cable 33 substantially determines the depth of the device 100 within the borehole 32. A depth gauge apparatus may be provided to measure cable displacement over a sheave wheel (not shown), and thus the depth of logging device 100 in the borehole 32. Control and communication circuitry 51 is shown at the surface of the formation 31, although portions thereof may be downhole. Also recorder 90 is also illustratively included for recording well-logging data, as well as a processor 50 for processing the data. However, one or both of the recorder 90 and processor 50 may be remotely located from the well site.

The tool 100 may include one or more type of logging devices that take measurements from which formation characteristics may be determined. For example, the logging device may be an electrical type of logging device (including devices such as resistivity, induction, and electromagnetic propagation devices), a nuclear logging device, a sonic logging device, or a fluid sampling logging device, as well as combinations of these and other devices. Devices may be combined in a tool string and/or used during separate logging runs. Also, measurements may be taken during drilling, tripping, and/or sliding. Some examples of the types of formation characteristics that may be determined using these types of devices include the following: determination, from deep three-dimensional electromagnetic measurements, of distance and direction to faults or deposits such as salt domes or hydrocarbons; determination, from acoustic shear and/or compressional wave speeds and/or wave attenuations, of formation porosity, permeability, and/or lithology; determination of formation anisotropy from electromagnetic and/or acoustic measurements; determination, from attenuation and frequency of a rod or plate vibrating in a fluid, of formation fluid viscosity and/or density; determination, from resistivity and/or nuclear magnetic resonance (NMR) measurements, of formation water saturation and/or permeability; determination, from count rates of gamma rays and/or neutrons at spaced detectors, of formation porosity and/or density; and determination, from electromagnetic, acoustic and/or nuclear measurements, of formation bed thickness.

By way of background, access to a calibration database of laboratory measurements on representative suites of core samples may be particularly helpful in order to make progress on "solving the mineralogy problem." This was recognized early on by the Schlumberger-Doll Research Center, which led the effort to acquire a Schlumberger geochemical core database starting in the early nineties. The database has grown today to approximately 1000 core samples and includes weight fractions of elemental compositions and minerals for a variety of rock types including shaly sands, shales, and carbonate rocks. In addition, the database includes matrix densities and a variety of other nuclear properties, for example.

The use of gamma ray spectroscopy data to predict mineralogy has a long history dating back to the introduction of gamma ray spectroscopy tools in the late 1970s. There are two different methods that are commonly used today in the industry. The first method is based on forward modeling. That is, one assumes that certain properties (e.g., density, hydrogen index, elemental composition, etc.) of the minerals are known and then writes response functions or equations that relate the tool measurements to the minerals. The selection of the minerals and the response functions specify the forward model. The response functions may be weighted linear sums of individual mineral responses multiplied by the weight fraction of each mineral. This method is used in Schlumberger's ELAN and QELAN software and in similar computerized log analysis software packages used in the industry. The mineralogy may be predicted by minimizing a cost function which is a weighted summation of the squared deviations of the measurements from the response equations. The weights may be the inverse variances in the measurements. The minimization is performed with respect to the weight fractions of the minerals in the model. Although the mineral response equations are assumed to be linear, a non-linear iterative constrained minimization is performed. The mineral fractions at which a global minimum of the cost function is attained provide the mineral fractions consistent with the data and the mineral model.

A potential drawback of this approach is that it is helpful to have accurate knowledge of the actual minerals present and the mineral properties. A given mineral (e.g., chlorite) may exist in many different compositional and structural states. The variability of the properties of individual minerals leads to errors in the predicted mineralogy. Another potential issue is the convergence of the minimization algorithm. There may be local minima which satisfy the iteration stopping conditions. The local minima depend on the assumed initial mineral fractions. The result is that non-optimal results may be accepted as valid. Furthermore, this method may have the number of response equations equal or exceed the number of mineral fractions that are to be determined.

A second method has been proposed that uses a database of over 400 core samples to develop linear regression equations for predicting quantitative rock mineralogy. This methodology forms the basis for the commercial Spectrolith interpretation of Schlumberger geochemical logs. The SDR database was also used a few years later to derive linear correlations for predicting accurate matrix densities from elemental compositions.

The Spectrolith interpretation method may have certain drawbacks. The Spectrolith interpretation is a sequential process that utilizes some user choices. For example, the user chooses both a clay model and a sulfur model. Moreover, the predicted mineralogy is a coarse representation of actual mineralogy in the sense that quartz, feldspar, and mica are lumped together and the individual clay types and weight fractions are presented as a weight fraction of total clay. It is desirable to develop a method for predicting the individual clay minerals, e.g., illite, chlorite, smectite, and kaolinite as well as mica and other complex minerals commonly found in sedimentary rocks.

Another potential drawback of some prior methods for predicting mineralogy from gamma ray spectroscopy tool logging data is that a subset of possible minerals is a priori selected and weight fractions of these minerals are predicted. The predicted percent weight fractions are forced to sum to 100 because that is used as a constraint. The subset of minerals selected might include minerals that are not present in the rock formations, or leave out minerals that are present in the formations. It is generally difficult to know if the predictions from the logs are accurate without comparing them to core mineralogy measurements. As will be discussed further below, the embodiments described herein provide an approach which does not necessitate a priori selection of a subset of minerals, and which allows the predicted percent mineral fractions to automatically sum to 100.

The inverse problem for predicting mineralogy from elemental composition is an example of a complex reservoir characterization problem for which accurate forward models are not known. Such problems therefore are difficult to solve accurately by conventional inversion methods which utilize a forward model. That is, conventional inversion methods used in the industry may solve the inverse problem by minimizing, with respect to the parameters to be predicted, a cost function which is a sum of the squared deviations between the measured data and the forward model. The measured data are the elemental compositions. The forward model for the mineralogy problem would be a function whose output would be the elemental composition given the mineralogy as an input. It will be appreciated that such forward models would necessitate detailed knowledge of the chemical formulas of the totality of the minerals that can occur in sedimentary rocks in appreciable quantities. Moreover, complex minerals in sedimentary rocks (e.g., chlorite) have a range of chemical compositions including various impurities and cannot be universally described by a single chemical formula or physical property.

In light of the complications discussed above it may be advantageous to have a model-independent inversion method for accurately predicting mineralogy from elemental composition data which does not necessitate knowledge of mineral properties. An embodiment of this disclosure utilizes a model-independent inversion method which is set forth in U.S. Pat. No. 7,309,983 to Freedman, which is assigned to the present Assignee Schlumberger Technology Corporation of Sugar Land, Tex., the entire contents of which are hereby incorporate herein by reference. This approach is based on a model-independent mapping function that is a linear combination of normalized Gaussian radial basis functions (RBFs). The parameters in the mapping function are determined from a calibration database. For rock samples not in the database, the mapping function predicts the mineralogy given measurements of the elemental composition. The mapping function is based on multi-dimensional interpolation within the calibration database. However, it should be noted that other multi-dimensional interpolation functions besides Gaussian RBFs may also be used in various embodiments.

Another example approach is set forth in U.S. Pat. No. 5,699,246 to Plasek et al., which is also assigned to the present Assignee. This patent is directed to a method to determine corrected characteristics of materials using the measured quantities obtained by a measurement and an extensive set of database points representing laboratory and modeled results in well defined environments. The approach relates to the measurement of the characteristics of the formation around a wellbore as well as of the borehole with a well logging tool. Using a dynamic parametrization technique, the environmental corrections and the transformations from the measured to the physical characteristics can be achieved in a more accurate, robust and flexible way. The dynamic local parametrization is based on a weighted multiple linear regression over the entire database to obtain the local coefficients for the transformation, which can be expressed as a simple equation.

For the mineralogy inverse issue, the calibration database includes laboratory measurements made on a large suite of representative core samples. On each core sample in the database, both elemental compositions and detailed mineralogy are measured. Matrix densities are also available either from direct measurements or computations from the mineral weight fractions. Other rock properties such as nuclear properties, dielectric constants, acoustic velocities, compressibilities, bulk and shear moduli, and other elastic constants may also be available.

A model-independent inversion method based on multi-dimensional interpolation within a calibration database may have other features besides not requiring a forward model. Interpolation is relatively computationally simple once the interpolating function is constructed from the database. Interpolation methods may not necessitate any non-linear minimization, which is computationally expensive. There are no problems with either convergence to a local instead of a global minimum or failure to converge altogether. Moreover, prior inverse methods often involve solving a system of equations for which the number of minerals predicted cannot exceed the number of measured elemental compositions. Inverse methods based on interpolation may overcome this consideration because the predictions need not involve solving a system of equations. For example, as will be discussed further below, one may predict fourteen weight fractions and the matrix density using nine elemental weight fractions (although other numbers of weight fractions may also be used in different configurations).

Consider a real-valued vector function, $\vec{f}(\vec{x})$. Let $\vec{f}(\vec{x})$ be an m-component vector function of a variable $\vec{x}$ which has n-components. Let the value of the function $\vec{f}(\vec{x_i})=\vec{y_i}$, be specified at N distinct points, $\vec{x_i}$. The function, $\vec{f}(\vec{x})$, can be approximated by a mapping function $\vec{F}(\vec{x})$ such that it satisfies the interpolation equations:

$$\vec{F}(\vec{x_i})=\vec{y_i}, i=1, 2 \ldots N. \quad (1)$$

The interpolation or mapping function is constructed from a linear combination of RBFs, i.e., $$\vec{F}(\vec{x}) = \sum_{i=1}^{N} \vec{c_i} \varphi(\|\vec{x} - \vec{x_i}\|). \quad (2)$$

The non-linear functions $\varphi(\|\vec{x}-\vec{x_i}\|)$ are called "radial" because they depend on the distance, not the direction, of $\vec{x_i}$, from an arbitrary input vector at which the function is to be evaluated. The argument is given by the Euclidean norm in the n-dimensional hyperspace, i.e., $$\|\vec{x}-\vec{x_i}\| = \sqrt{\sum_{k=1}^{n}(x_k - x_{i,k})^2} \quad (3)$$

The coefficient vectors $\vec{c}$ in Eq. (2) may be determined by substituting Eq. (2) into the interpolation equations (1). The resulting set of linear equations may be represented in the following matrix notation:

$$\Phi \cdot C = Y, \quad (4)$$

where C is a matrix whose rows are the coefficient vectors, i.e., $$C = \begin{bmatrix} c_{1,1} & c_{1,2} & \cdots & c_{1,m} \\ c_{2,1} & c_{2,2} & \cdots & c_{2,m} \\ \vdots & \vdots & \vdots & \vdots \\ \vdots & \vdots & \vdots & \vdots \\ c_{N,1} & c_{N,2} & \cdots & c_{N,m} \end{bmatrix}. \quad (5)$$

The matrices $\Phi$ and Y are N×N and N×m matrices, respectively. The matrix elements of $\Phi$ are the RBFs evaluated at the database input vectors and the matrix elements of Y are the database output vectors, i.e., $$\Phi = \begin{bmatrix} \varphi_{1,1} & \varphi_{1,2} & \cdots & \varphi_{1,N} \\ \varphi_{2,1} & \varphi_{2,2} & \cdots & \varphi_{2,N} \\ \vdots & \vdots & \vdots & \vdots \\ \vdots & \vdots & \vdots & \vdots \\ \varphi_{N,1} & \varphi_{N,2} & \cdots & \varphi_{N,N} \end{bmatrix}, \quad (6)$$

$$Y = \begin{bmatrix} y_{1,1} & y_{1,2} & \cdots & y_{1,m} \\ y_{2,1} & y_{2,2} & \cdots & y_{2,m} \\ \vdots & \vdots & \vdots & \vdots \\ \vdots & \vdots & \vdots & \vdots \\ y_{N,1} & y_{N,2} & \cdots & y_{N,m} \end{bmatrix}. \quad (7)$$

The coefficient matrix C is obtained from the solution of Eq. (8), $$C = \Phi^{-1} \cdot Y. \quad (8)$$

A unique property that makes RBFs useful for interpolation is that the matrix $\Phi$ is invertible for several types of RBFs. For an unknown sample not included in the database, the desired output y may be obtained by evaluating the mapping function at the corresponding input x i.e., $$y = F(x) \quad (9)$$

Figure 3:
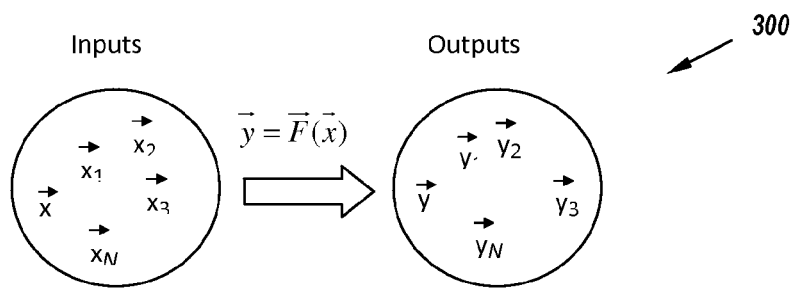
FIG. 3 is a pictorial representation of a mapping function method which may be used in accordance with an example embodiment, in which the inputs are mapped into outputs using a mapping function which is a linear combination of radial basis functions.
Figure 4:
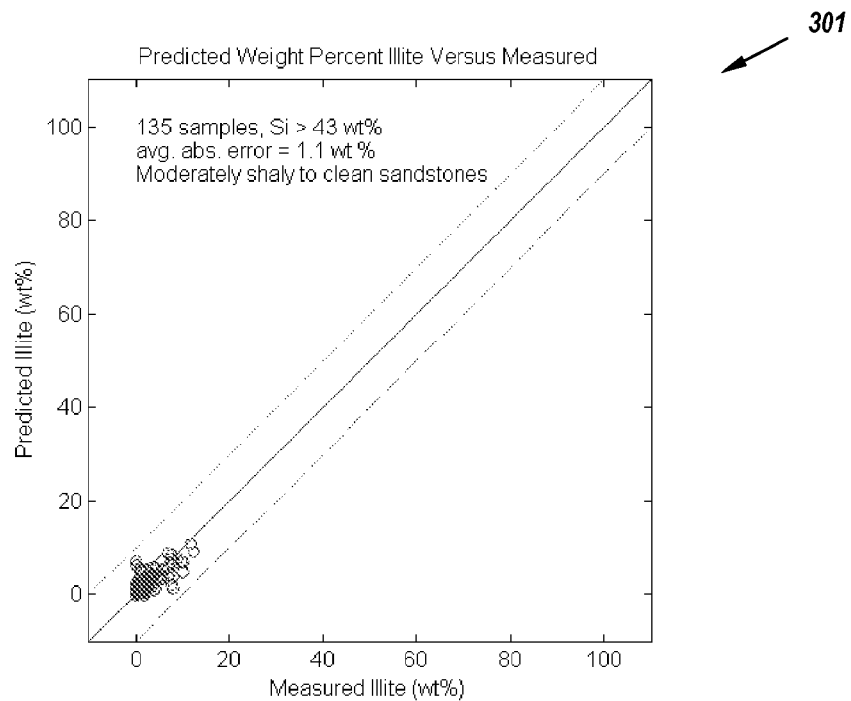
FIG. 4 is a graph of predicted versus measured weight percentage for illite clay in accordance with an example embodiment.
Figure 5:
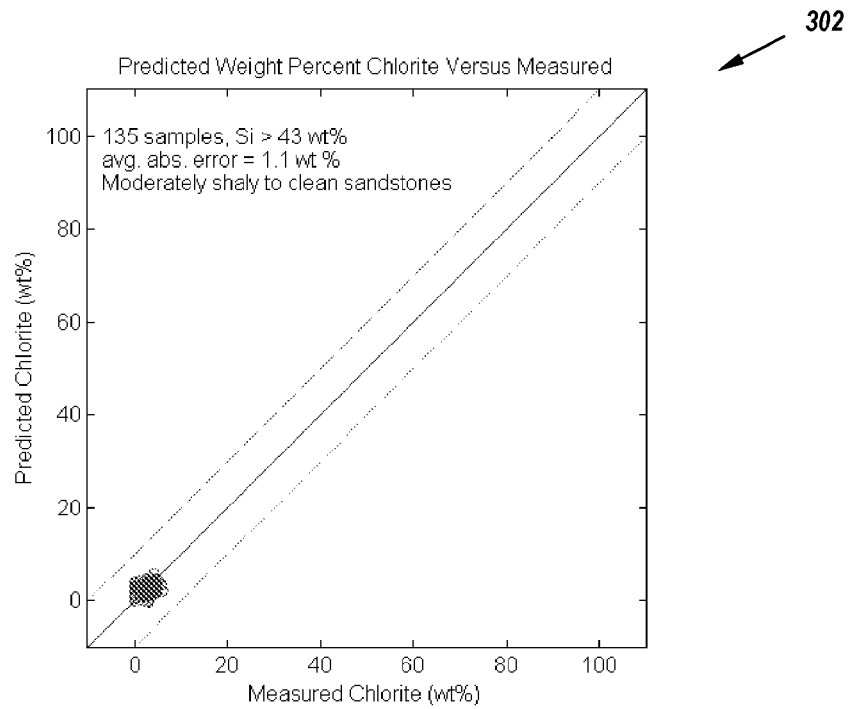
FIG. 5 is a graph of predicted versus measured weight percentage for chlorite clay in accordance with an example embodiment.
Figure 6:
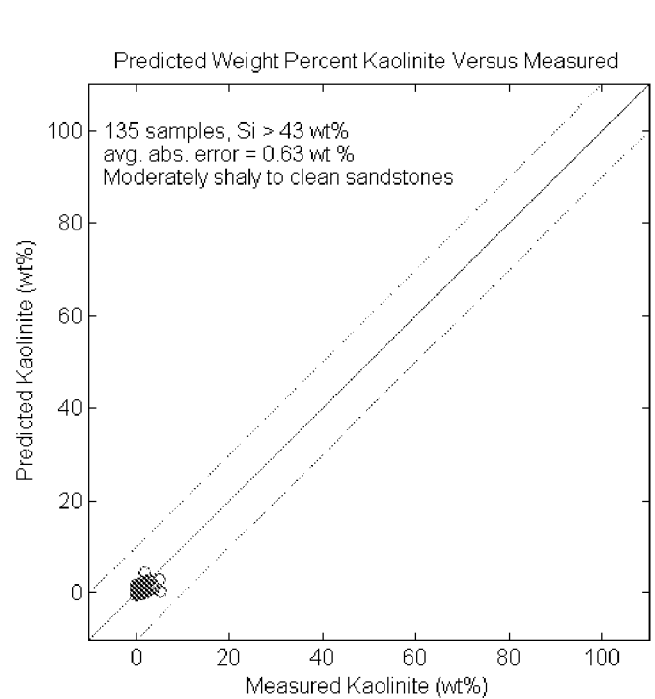
FIG. 6 is a graph of predicted versus measured weight percentage for kaolinite clay in accordance with an example embodiment.
Figure 7:
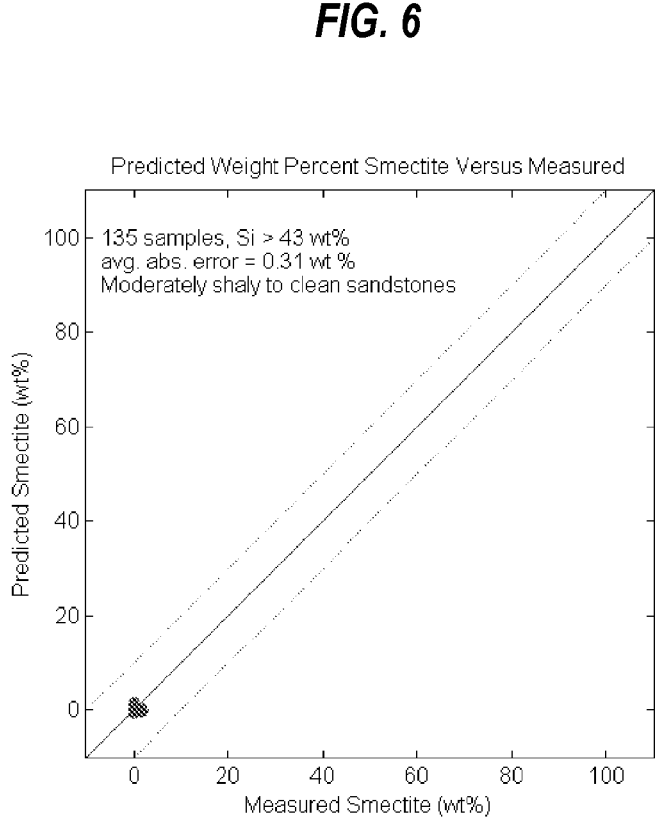
FIG. 7 is a graph of predicted versus measured weight percentage for smectite clay in accordance with an example embodiment.
Figure 8:
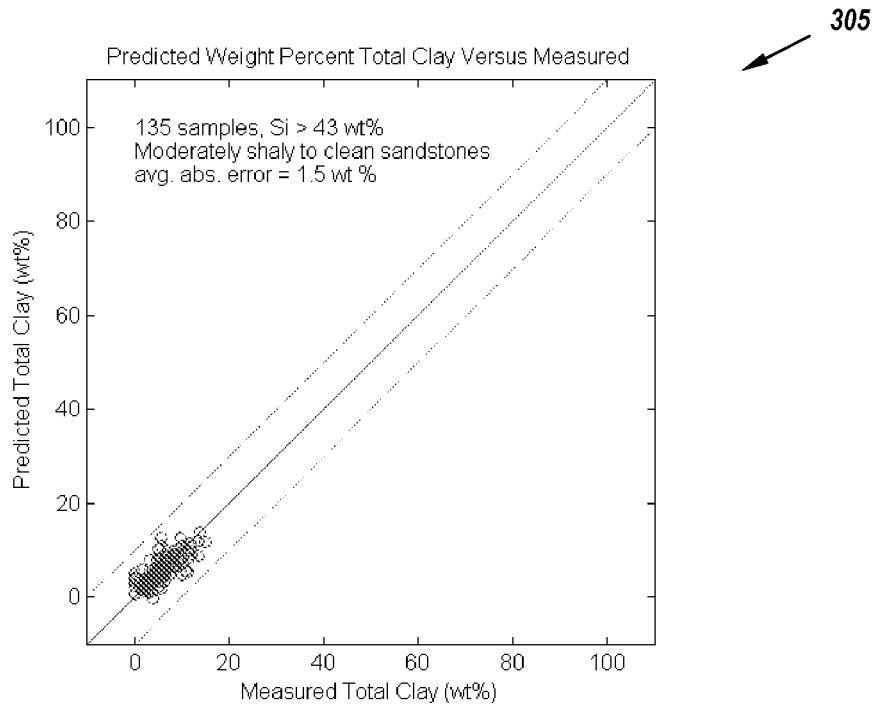
FIG. 8 is a graph of predicted versus measured weight percentage for total clay in accordance with an example embodiment.
Figure 9:
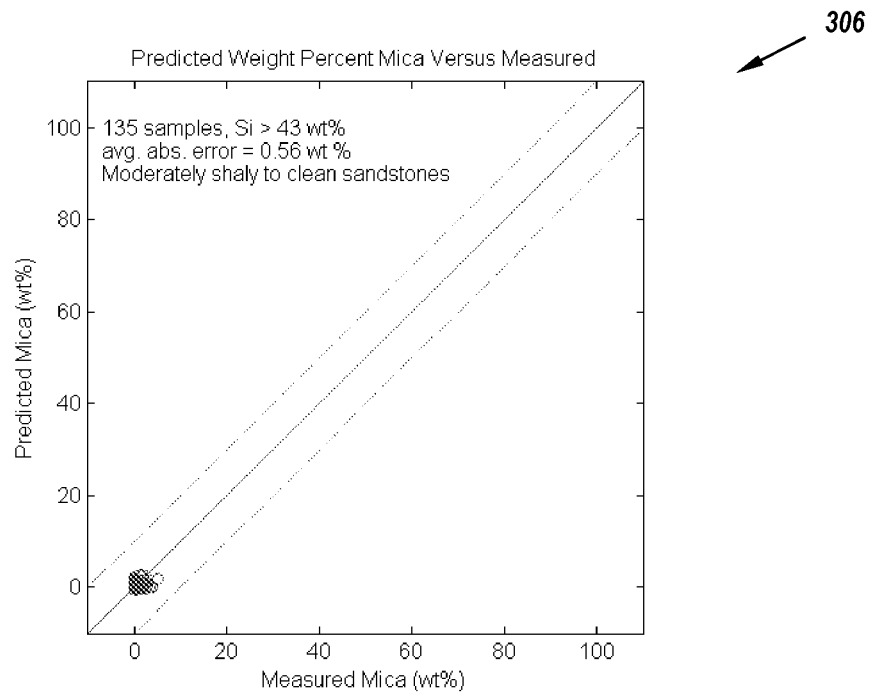
FIG. 9 is a graph of predicted versus measured weight percentage for mica in accordance with an example embodiment.
Figure 10:
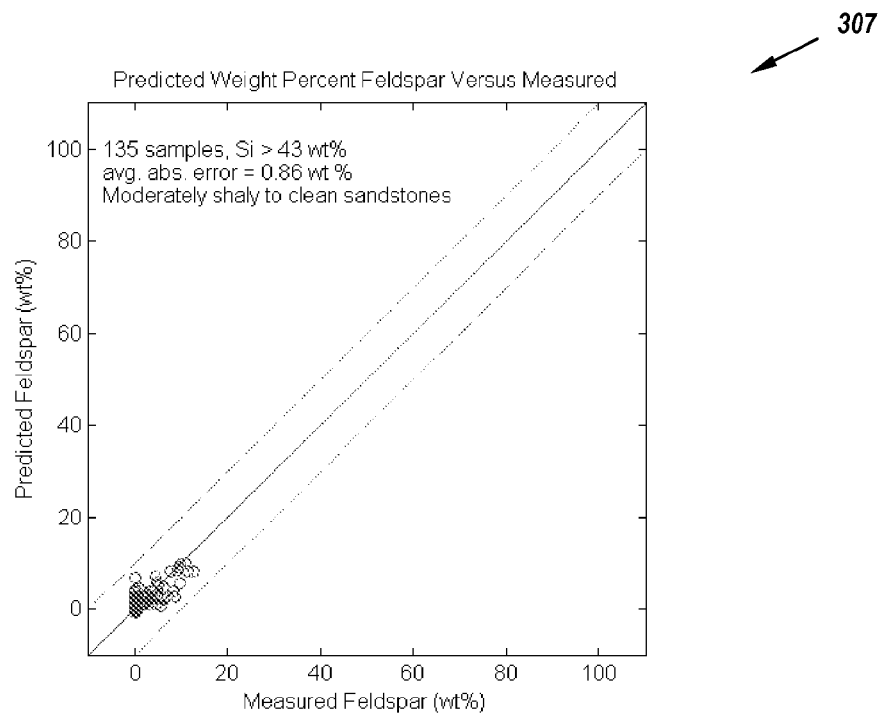
FIG. 10 is a graph of predicted versus measured weight percentage for feldspar in accordance with an example embodiment.
Figure 11:
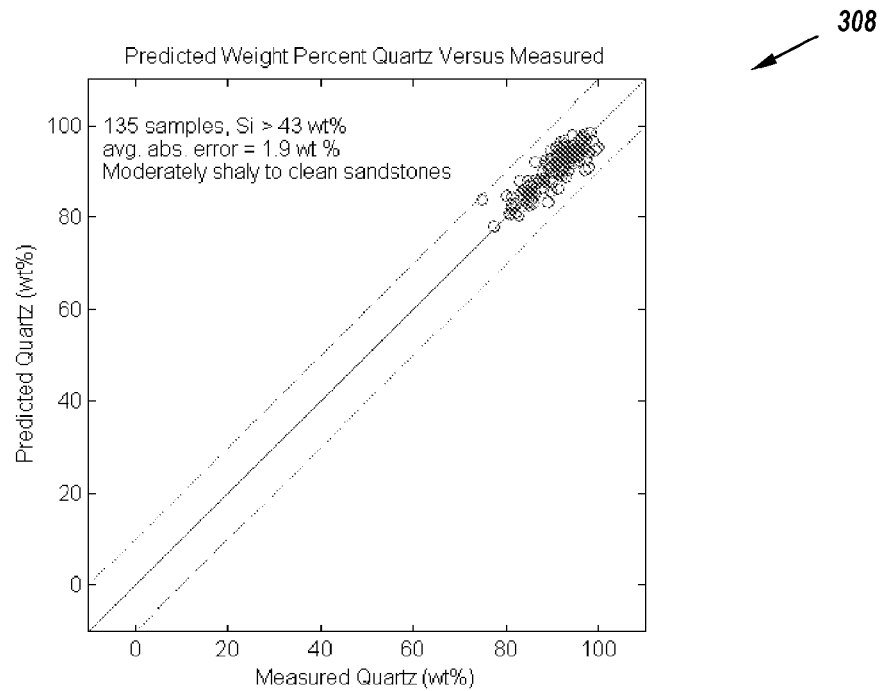
FIG. 11 is a graph of predicted versus measured weight percentage for quartz in accordance with an example embodiment.
Figure 12:
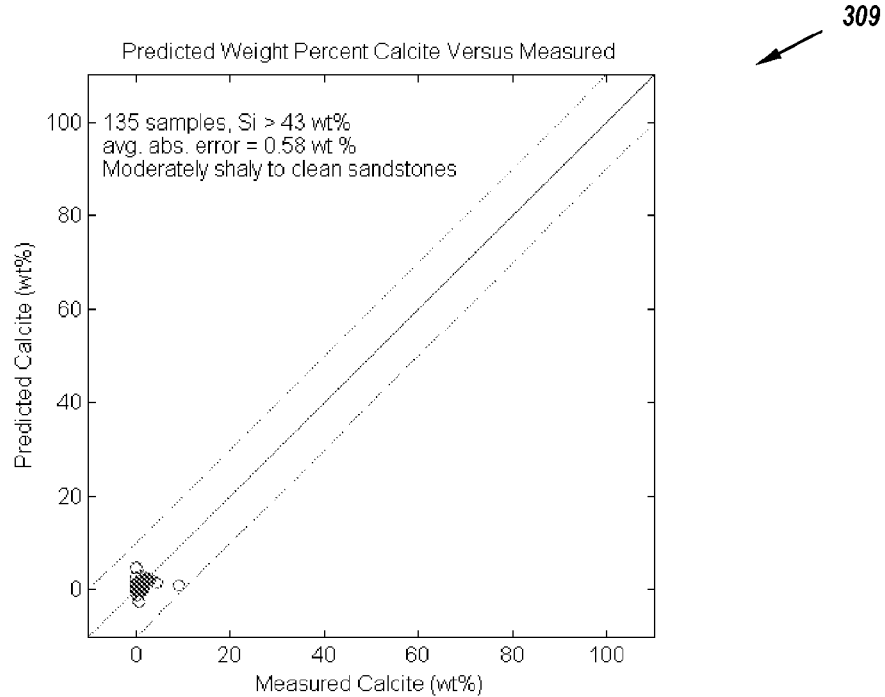
FIG. 12 is a graph of predicted versus measured weight percentage for calcite in accordance with an example embodiment.
Figure 13:
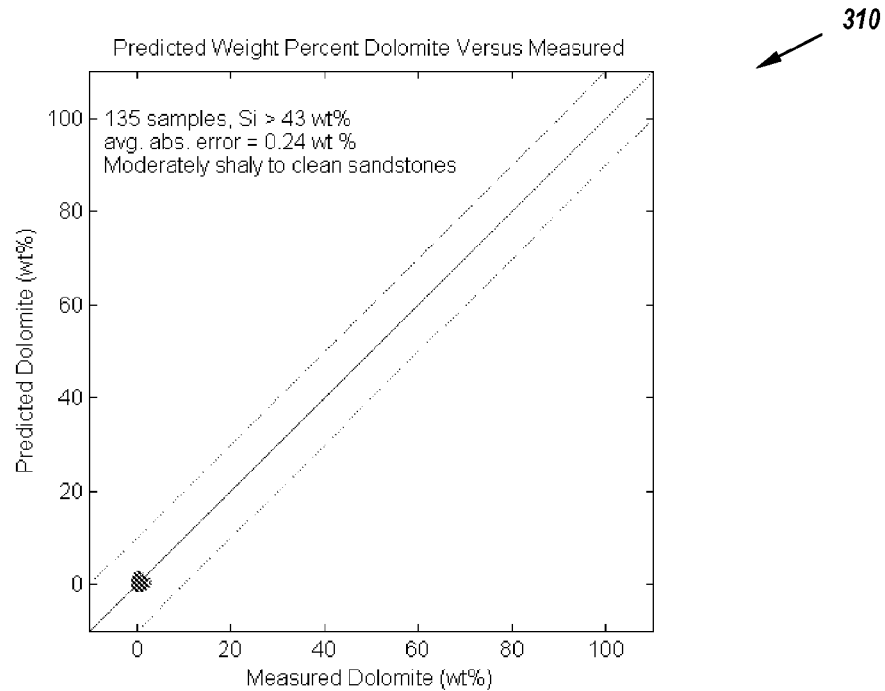
FIG. 13 is a graph of predicted versus measured weight percentage for dolomite in accordance with an example embodiment.
Figure 14:
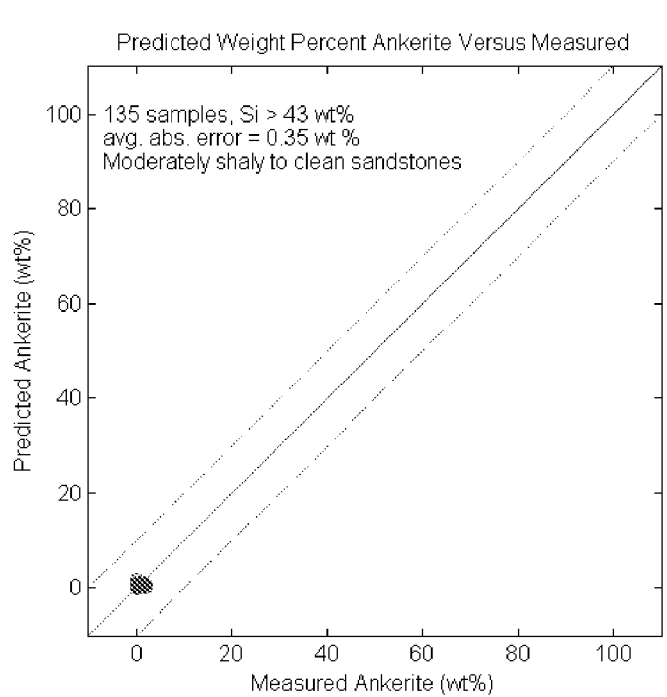
FIG. 14 is a graph of predicted versus measured weight percentage for ankerite in accordance with an example embodiment.
Figure 15:
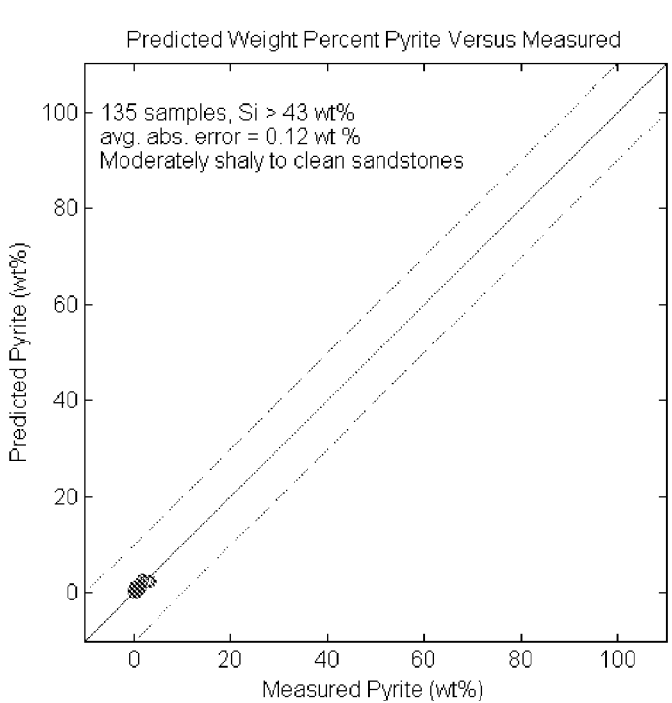
FIG. 15 is a graph of predicted versus measured weight percentage for pyrite in accordance with an example embodiment.
Figure 16:
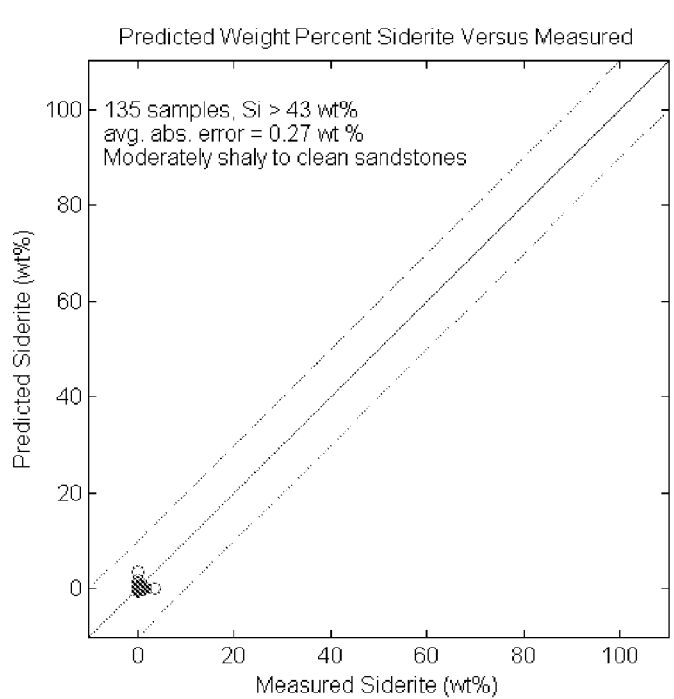
FIG. 16 is a graph of predicted versus measured weight percentage for siderite in accordance with an example embodiment.
Figure 17:
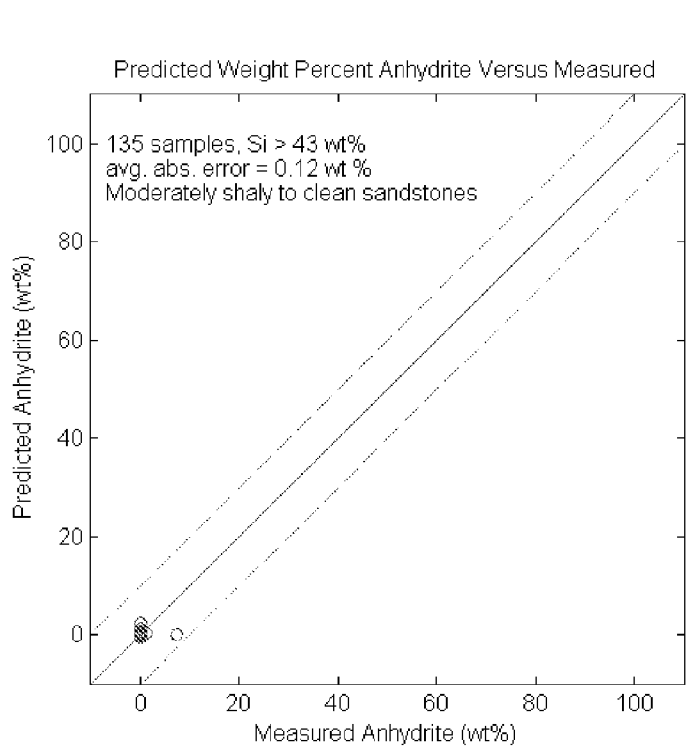
FIG. 17 is a graph of predicted versus measured weight percentage for anhydrite in accordance with an example embodiment.
Figure 18:
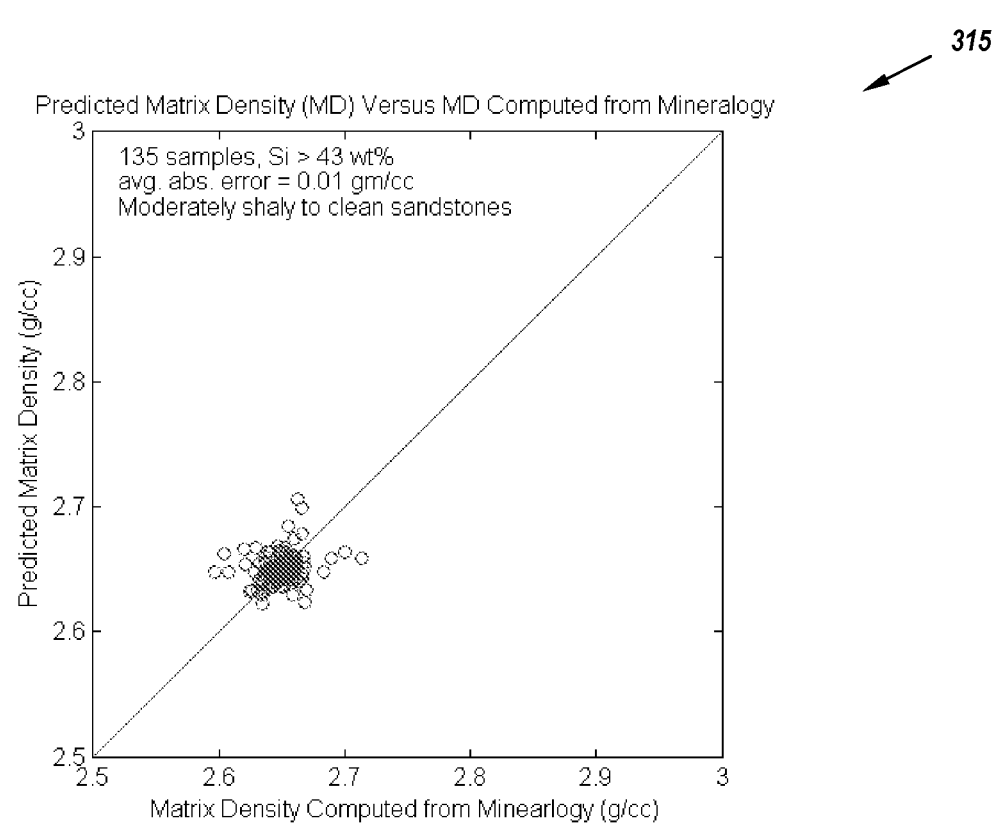
FIG. 18 is a graph of predicted matrix densities versus those computed from measured database mineralogy in accordance with an example embodiment.

A high level implementation of this approach is shown in a diagram 300 of FIG. 3. The database inputs $(\overline{x_1}, \overline{x_2}, \ldots)$ are mapped to the corresponding database outputs $(\overline{y_1}, \overline{y_2}, \ldots)$ using a function $\overline{F}(\overline{x})$. The mapping function is a linear combination of RBFs. The expansion coefficients are uniquely determined such that the interpolation equations (1) are satisfied for the N samples in the database. The output y for a sample x not included in the database may be calculated using the mapping function with known coefficients.

Several forms of RBFs are described in the mathematical literature. One of the most commonly used forms is the normalized Gaussian RBF shown below $$\varphi(\|\vec{x} - \vec{x_i}\|) = \frac{\exp\left(-\frac{\|\vec{x} - \vec{x_i}\|^2}{2s_i^2}\right)}{\sum_{j=1}^{N} \exp\left(-\frac{\|\vec{x} - \vec{x_j}\|^2}{2s_j^2}\right)}. \quad (10)$$

The normalization in the denominator scales the Gaussian RBF between 0 and 1. Substituting the equation for the normalized Gaussian RBF into Eq. (2), the mapping function becomes, $$\vec{F}(\vec{x}) = \frac{\sum_{i=1}^{N} \vec{c_i} \exp\left(-\frac{\|\vec{x} - \vec{x_i}\|^2}{2s_i^2}\right)}{\sum_{i=1}^{N} \exp\left(-\frac{\|\vec{x} - \vec{x_i}\|^2}{2s_i^2}\right)}. \quad (11)$$

Hence, the mapping function is a linear combination of multi-dimensional Gaussian functions whose centers are located at the database inputs. The localized nature of Gaussian functions implies that the mapping function has the largest contribution from the database inputs that are nearest to $\overline{x}$. The database inputs that are far removed from $\overline{x}$ make a negligible contribution to the function.

The parameters, $s_1$ are the widths of the Gaussian functions. For large values of $s_1$, the Gaussian functions are relatively broad. In the limit $s_1, \rightarrow \infty$, mapping function attains a constant value equal to the average of the database outputs, $$\lim_{s_i \to \infty} \vec{F}(\vec{x}) = \frac{\sum_{i=1}^{N} \vec{y}_i}{N}. \quad (12)$$

In the limits $s_1 \to 0$, the mapping function is a combination of delta functions located at database inputs. For best interpolation, the optimal value of $s_1$ is selected to allow sufficient overlap between nearest neighbors in the input space and negligible overlap between distant ones. Thus, the value is chosen proportional to the nearest neighbor distance of the database inputs.

The present approach may overcome difficulties associated with prior methods and provide accurate predictions of the mineral weight fractions and matrix densities given the elemental weight fractions measured by gamma ray spectroscopy logging tools or other suitable methods, such as X-ray fluorescence (XRF), energy dispersive X-ray, Inductively Coupled Plasma (ICP), etc. The present approach may predict mineralogy and other rock properties, such as matrix densities, without requiring any knowledge of mineral properties, e.g., the elemental composition of the minerals. Moreover, mineralogy is predicted from the measured elemental compositions without a need to minimize a cost function or to fit the measured elemental weight fractions to a set of forward model response equations.

Figure 2:
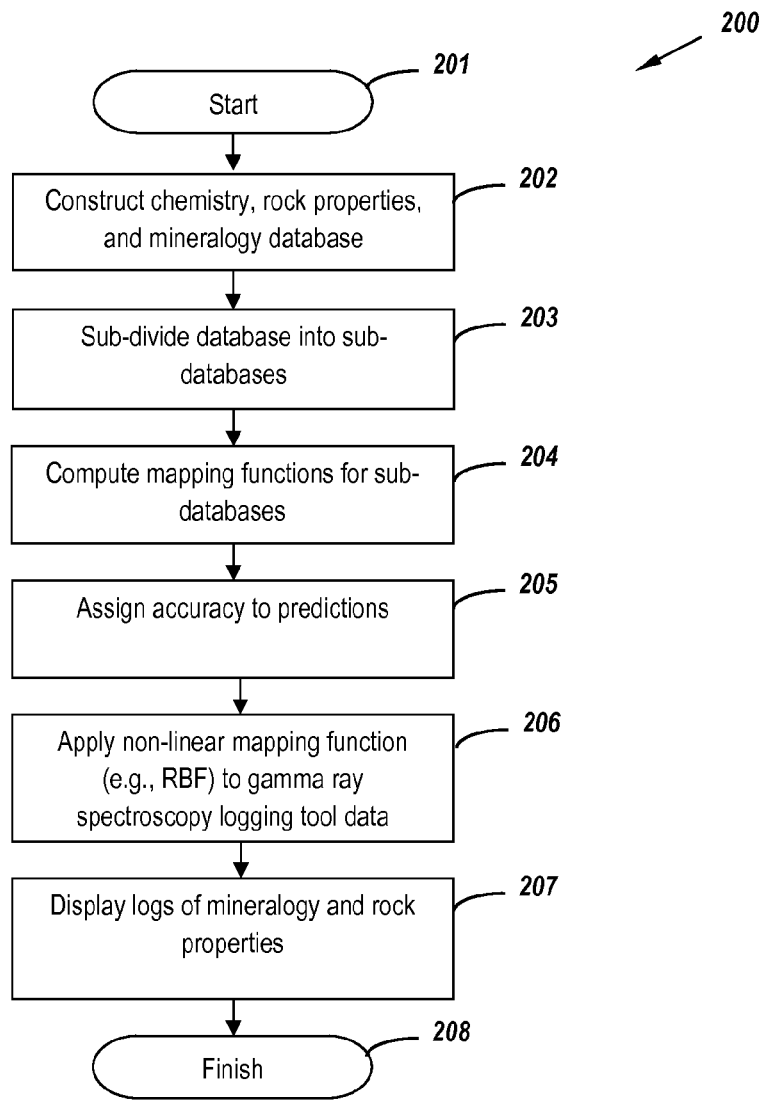
FIG. 2 is a flow diagram of a method for predicting mineralogy properties of a sample elemental composition in accordance with an example embodiment.

An example method for implementing the above-described interpolation approach will now be described with reference to the flow diagram 200 of FIG. 2. Beginning at Block 201, a reference database may be constructed including measurements of the chemistry and detailed mineralogy made on a representative suite of rock core samples. For example, if one is interested in predicting mineralogy and matrix densities from elemental compositions measured by gamma ray spectroscopy tools in shaly sand and shale formations, then the database may include samples ranging from clean to extremely shaly sands and shales. A more general database may include shaly sands, carbonates, evaporites, and shales. The database may either be a local one constructed from cores obtained from a specific formation (e.g., Eagleford Shale, Wilcox, etc.), or a more global database including samples from worldwide formations. The database may include pure mineral samples or stoichiometric compositions of pure mineral or mineral mixtures, for example. At Block 202, a database of mineralogy, chemistry and rock properties is assembled.

To improve the accuracy of the predicted mineralogy, it may be desirable to optionally divide a large database into several smaller sub-databases such that within each sub database the mineralogical and chemical properties of the rocks are more similar than those in the whole database (Block 203). The sub databases may be selected based on the chemistry, for example, the measured weight percent of Si or Calcite or some other criterion. Note that subdividing of the database may be omitted in some implementation. The sub databases (or the full database if sub databases are not used) may be divided into input and output measurements. The input measurements are the weight fractions of the elements (e.g., Si, Al, Ca, Mg, Na, K, Fe, S, Ti, Mn, etc.) measured in the laboratory on the core samples, for example. The database outputs are the weight fractions of the minerals (e.g., clays, mica, quartz, calcite, dolomite, ankerite, etc.) measured in the laboratory on the core samples. The percent weight fractions of the database minerals may sum to 100.

The database (or sub database) may be used to construct one or more RBF mapping functions as discussed above with respect to Eqs. (2)-(8), at Block 204. The inputs and outputs of the mapping functions may be, respectively, the chemistry and mineralogy for each core sample in the database.

Figure 20:
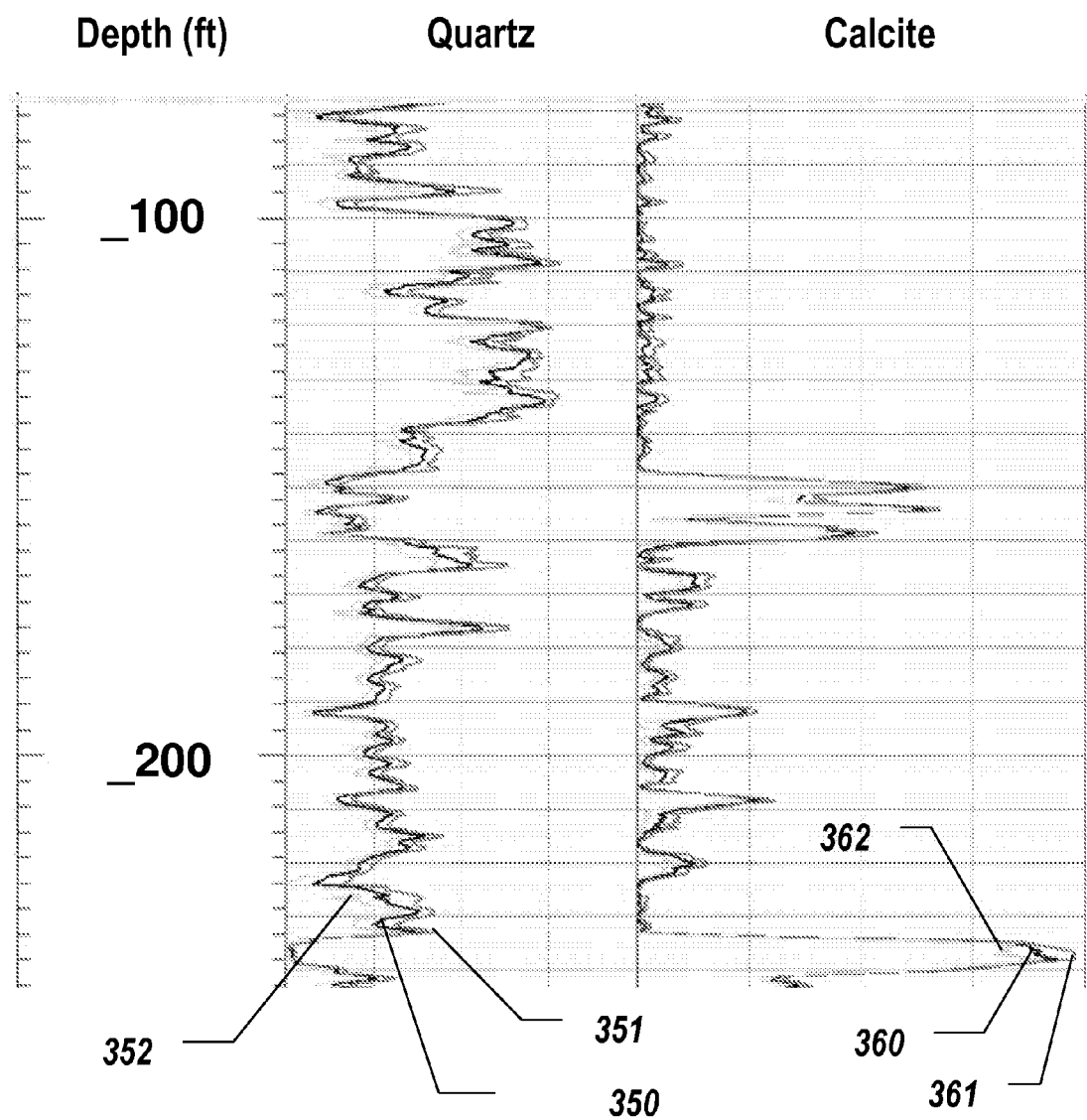
FIG. 20 is a log of predicted mineralogical weight fractions together with logs of plus and minus one standard deviation in the predicted mineralogical weight fractions.

In some embodiments it may be desirable to test the accuracy of the mineralogy and matrix densities that may be predicted using the RBF mapping functions constructed from the database (or sub database), at Block 205. This may optionally be done using a "leave-one-out" method. More particularly, a sample may be removed from the database, the mapping function may be computed for the reduced database, and then mineralogy and matrix density may be predicted using the elemental composition as the inputs for the sample removed. This process may be repeated for each sample in the database (or sub database). The average absolute deviations of the predicted mineralogy and matrix density from the actual or lab measured values provide a metric for assessing the accuracy of the predictions. The leave-one-out method provides a metric for assessing the accuracy of the predicted mineralogical weight fractions. The uncertainties or precisions in the predicted mineralogical weight fractions caused by known "noise" or measurement errors on the weight chemical elemental weight fractions can be computed from the mapping function given the standard deviations in the elemental weight fractions. The sources of the noise are statistical and can be traced to finite count rates, thermal noise in the electronics, etc. FIG. 20 shows an example of predicted logs 350, 360 for quartz and calcium, respectively. Also shown are associated plots of plus one standard deviation 351, 361 and minus one standard deviation 352, 362 for quartz and calcium, respectively, in the predicted mineralogical weight fractions caused by noise on the measured elemental weight fractions.

Upon acquiring logging tool or core sample elemental weight fraction data, the RBF mapping functions computed from the database may be used to predict mineralogy and other properties such as matrix density, for example (Block 206). For logging tool data, logs of predicted mineralogy and matrix density versus measured depth may be generated and displayed, at Block 207, which illustratively concludes the method shown in FIG. 2 (Block 208).

The foregoing will be further understood with reference to an example implementation of the database for clastic/shale compositions. The clastics/shale database included hundreds of core samples with laboratory measured chemistry and mineralogy, which was used to test and validate the above-described approach. The database also included matrix densities. Weight fractions of the nine chemical elements Si, Al, Ca, Mg, K, Fe, S, Ti, Mn were used as the database inputs. The outputs were the percent weight fractions of the thirteen minerals illite, smectite, kaolinite, chlorite, mica, quartz, calcite, dolomite, ankerite, total feldspar, pyrite, siderite, anhydrite plus total clay and matrix density, and these outputs are respectively provided in graphs 301-315 of FIGS. 4-18. The predicted thirteen mineral weight fractions automatically sum to 100%, without imposing this as a constraint. The database was divided into three sub databases depending on the value of the weight percent of Si. The samples with Si>43 wt % were put into a "clean to moderately shaly sand" sub database. The samples with Si=<43 wt % and Si>=33 wt % were put into a "moderately to very shaly sand" sub database. The samples with Si<33 wt % were put into a "very shaly sand to shale" sub database. RBF mapping functions were derived for each of the three sub databases and the leave-one-out method was used to determine the accuracy of the predicted mineralogy and matrix densities.

The graphs 301-306 show some of the results of the leave-one-out method for the Si>43 wt % sub database. The average absolute errors are shown on the plots. These errors are the absolute deviations of the mapping function predictions from the database values averaged over those samples in this subset. The solid line in the plots is the equal value line drawn at forty-five degrees. The two dashed lines are +/−10 weight percent deviations from the equal value line. Comparable errors were obtained for the sub database with subset of samples with Si between 33 and 43 wt %, however, the average absolute errors for the Si<33 wt % were slightly higher. It should be noted that in other embodiments the database does not have to be subdivided, as one can derive a mapping function for the total database which also provides reasonable predictions for the mineral weight fractions and the matrix density, for example.

Figure 19:
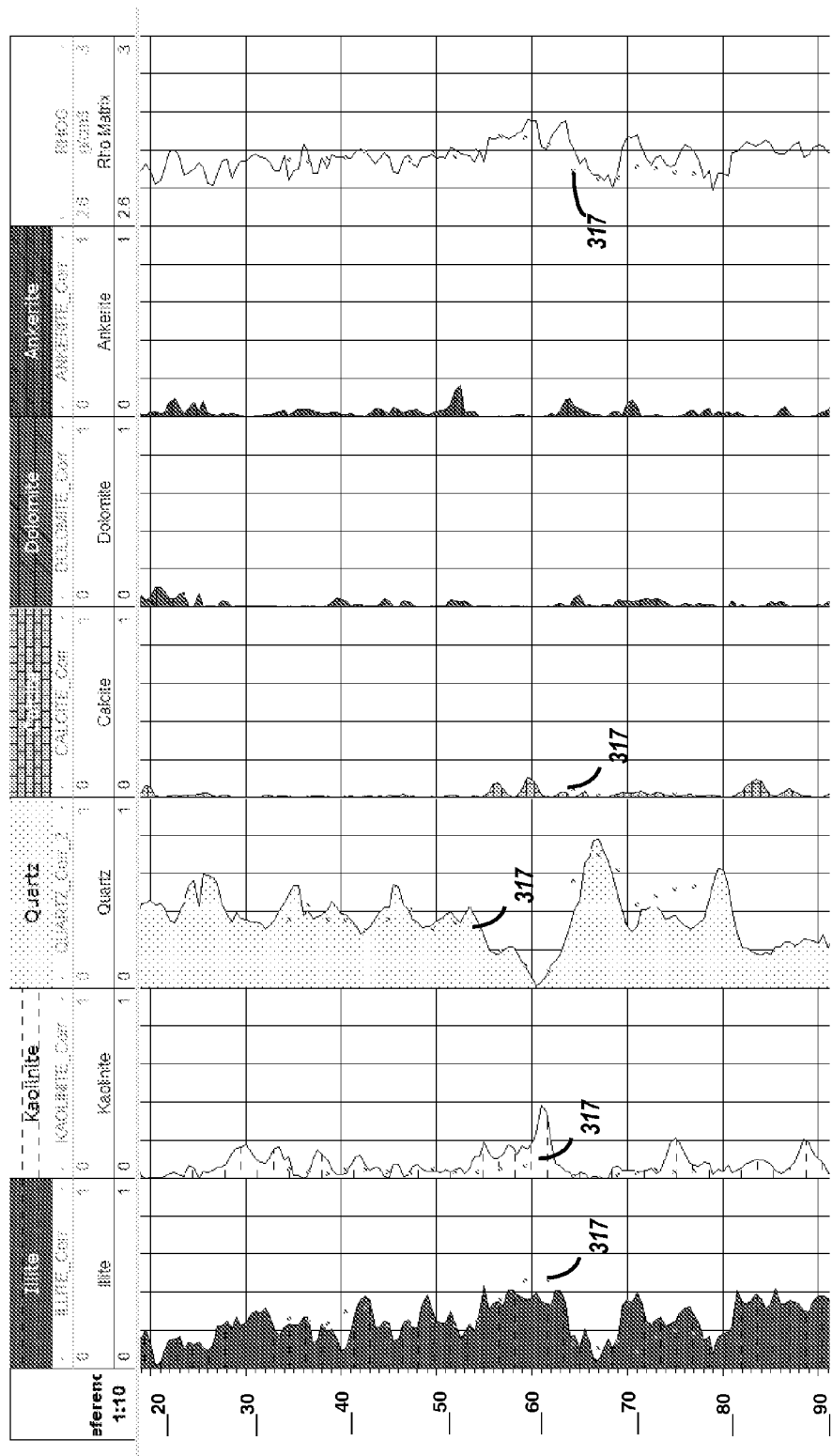
FIG. 19 is a series of logs of predicted mineralogical weight fractions and matrix densities derived from elemental weight fractions measured by a gamma ray spectroscopy logging tool in accordance with an example embodiment.

The mapping function derived from the shaly sand/shale database discussed above was also applied to elemental composition log data acquired by a gamma ray spectroscopy logging tool in a shaly sand well. The logging tool acquired both capture and inelastic gamma spectra which were used to derive weight fractions of a suite of chemical elements that included the nine elements Si, Al, Ca, Mg, K, Fe, S, Ti, and Mn. A series of logs 316 of predicted mineralogical weight fractions and matrix densities derived from elemental weight fractions measured by a gamma ray spectroscopy logging tool at shown in FIG. 19. The logs 316 provide a comparison of some of the mineral weight fractions predicted by the RBF mapping function with those measured in the laboratory on core samples that were recovered from the logged interval. The core measured mineral weight fractions are indicated in the plot by dots 317. That is, the dots 317 are mineralogical weight fractions and matrix densities measured in the laboratory on core samples. Note the very good overall agreement between the predictions and the laboratory measured values, especially for illite and quartz which are the most abundant minerals present in the sample well. The agreement between the matrix densities predicted from the nine elemental weights and the matrix densities measured on the core samples is also excellent.

It will be appreciated that the above-described method is not solely for use in shaly sand or shale reservoirs. Rather, it may also be extended to carbonate reservoirs and complex mixed lithology reservoirs provided that the calibration database includes carbonate and mixed lithology core samples. Similarly, it will be understood that other rock properties in addition to matrix densities may be predicted from the chemistry, provided that such properties are included in the calibration database. Such rock properties may include other matrix properties, nuclear properties, etc., for example. Similarly, it should be understood that the method is applicable to any set of elemental data, for example, elemental data measured by XRF, ICP, energy dispersive X-ray or any other technique on outcrop samples, cuttings samples, core samples, etc.

It will also be appreciated that the above-described methods may be applied to numerous types of logs, e.g., sigma, resistivity, permittivity, porosity, density, acoustic and combinations thereof. While the disclosure has been described with respect to a given number of embodiments, those skilled in the art, having benefit of this disclosure, will appreciate that other embodiments may be implemented that do not depart from the scope of the disclosure as disclosed herein.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A method for predicting mineral composition of a geological formation comprising:
   generating, in a computer, a non-linear mapping function for mapping elemental composition to mineral composition based on mapping function values relating a plurality of reference elemental compositions to corresponding reference mineral compositions, wherein reference elemental compositions and corresponding mineral compositions are obtained from previous measurements on calibration samples;
   measuring a rock formation associated with the geological formation with a gamma ray spectroscopy tool and obtaining measurements corresponding to a weight fraction of a plurality of chemical elements in the rock formation;
   determining an elemental composition of the rock formation from the measurements;
   performing, using a processor, an interpolation to map the determined elemental composition to mineral composition of the rock formation based upon the mapping function values and the at least one non-linear mapping function; and
   displaying the mineral composition of the rock formation in a log;
   wherein the elemental composition comprises weight fractions of one or more of Si, Al, Ca, Mg, K, Fe, S, Ti, and Mn, and/or the mineral composition comprises weight fractions of one or more of illite, semectite, kaolinite, chlorite, mica, quartz, calcite, dolomite, ankerite, feldspar, pyrite, siderite, anhydrite, and clay.

2. The method of claim 1 wherein the at least one non-linear mapping function comprises at least one radial basis function (RBF).

3. The method of claim 2 wherein the at least one RBF function comprises a linear combination of a plurality of RBFs.

4. The method of claim 1 wherein the mapping function values comprise mapping function coefficients for the at least one non-linear mapping function.

5. The method of claim 1 further comprising determining at least one of a matrix density, a dielectric constant, an acoustic velocity, a compressibility, a bulk modulus, a shear modulus, and an elastic constant of the rock formation using the determined mineral composition.

6. The method of claim 1 wherein the reference elemental compositions comprise at least one of shale compositions, carbonates, and sandstones.

7. The method of claim 1 further comprising making measurements corresponding to the weight fraction of each of the plurality of chemical elements on a plurality of rock formations at different depths in the geological formation; and further comprising determining, using the processor, a plurality of corresponding mineral compositions for the different depths.

8. The method of claim 1 further comprising using the processor to determine an uncertainty associated with predicted mineralogical weight fractions for the elemental composition based upon the at least one non-linear mapping function and standard deviations associated with elemental weight fractions.

9. A well-logging system comprising:

a gamma ray spectroscopy tool having at least one sensor to determine an elemental composition of at least one rock formation associated with the geological formation; and a processor to determine a non-linear mapping function for mapping elemental composition to mineral composition based on mapping function values relating a plurality of reference elemental compositions to corresponding reference mineral compositions, wherein reference elemental compositions and corresponding mineral compositions are obtained from previous measurements on calibration samples, perform an interpolation to map the elemental composition to a mineral composition of the at least one rock formation based upon the mapping function values and the at least one non-linear function; and displaying the mineral composition of the rock formation in a log;

wherein the elemental composition comprise weight fractions of one or more of Si, Al, Ca, Mg, K, Fe, S, Ti, and Mn, and/or the mineral composition comprises weight fractions of one or more of illite, semectite, kaolinite, chlorite, mica, quartz, calcite, dolomite, ankerite, feldspar, pyrite, siderite, anhydrite, and clay.

10. The well-logging system of claim 9 wherein the at least one non-linear mapping function comprises at least one radial basis function (RBF).

11. The well-logging system of claim 9 wherein the mapping function values comprise mapping function coefficients for the at least one non-linear mapping function.

12. The well-logging system of claim 9 wherein the processor is further configured to determine at least one of a matrix density, a dielectric constant, an acoustic velocity, a compressibility, a bulk modulus, a shear modulus, and an elastic constant of the rock formation using the determined mineral composition.

* * * * *